(12) United States Patent
Nakatsuka et al.

(10) Patent No.: US 8,913,122 B2
(45) Date of Patent: Dec. 16, 2014

(54) IMAGE-ACQUISITION DEVICE FOR MICROSCOPE AND MICROSCOPE OBSERVATION METHOD

(75) Inventors: Masayuki Nakatsuka, Tokyo (JP); Hiroshi Fujiki, Tokyo (JP)

(73) Assignee: Olympus Corporation, Tokyo (JP)

( * ) Notice: Subject to any disclaimer, the term of this patent is extended or adjusted under 35 U.S.C. 154(b) by 291 days.

(21) Appl. No.: 13/342,290

(22) Filed: Jan. 3, 2012

(65) Prior Publication Data

US 2012/0182411 A1 Jul. 19, 2012

(30) Foreign Application Priority Data

Jan. 17, 2011 (JP) .................................. 2011-007221

(51) Int. Cl.
| | | |
|---|---|---|
| *H04N 9/47* | (2006.01) | |
| *H04N 5/225* | (2006.01) | |
| *G02B 21/36* | (2006.01) | |
| *H04N 5/232* | (2006.01) | |
| *H04N 5/235* | (2006.01) | |
| *H04N 5/345* | (2011.01) | |
| *H04N 5/347* | (2011.01) | |

(52) U.S. Cl.
CPC ............ *H04N 5/2258* (2013.01); *G02B 21/367* (2013.01); *H04N 5/23216* (2013.01); *H04N 5/2353* (2013.01); *H04N 5/3454* (2013.01); *H04N 5/347* (2013.01)
USPC .......................................................... 348/79

(58) Field of Classification Search
USPC ............... 348/79, 345; 358/1.2, 514; 359/387
See application file for complete search history.

(56) References Cited

U.S. PATENT DOCUMENTS

| | | | | |
|---|---|---|---|---|
| 2003/0016301 A1* | 1/2003 | Aizaki et al. | .................. | 348/345 |
| 2003/0048493 A1* | 3/2003 | Pontifex et al. | ............... | 358/514 |
| 2005/0243414 A1* | 11/2005 | Masuyama | .................... | 359/387 |
| 2006/0279748 A1* | 12/2006 | Kamisuwa | ..................... | 358/1.2 |
| 2010/0214405 A1* | 8/2010 | Ariga | .............................. | 348/79 |

FOREIGN PATENT DOCUMENTS

| | | |
|---|---|---|
| JP | 2001-154114 A | 6/2001 |
| JP | 2002-94862 A | 3/2002 |
| JP | 2002-135788 | 5/2002 |
| JP | 2007-43248 A | 2/2007 |
| JP | 2008-139795 A | 6/2008 |

\* cited by examiner

*Primary Examiner* — Tung Vo
*Assistant Examiner* — Rowina Cattungal
(74) *Attorney, Agent, or Firm* — Scully, Scott, Murphy & Presser, P.C.

(57) ABSTRACT

Proper exposure is achieved within a short period of time even when image-acquisition elements are switched. Provided is an image-acquisition device for a microscope, which includes an optical-path branching section that branches light from an object into two optical paths; a first image-acquisition element and a second image-acquisition element that are respectively disposed in the two optical paths branching from the optical-path branching section and that acquire images of the light from the object under different image-acquisition conditions; and an exposure-time calculator that calculates an exposure time for the second image-acquisition element on the basis of an exposure time for the first image-acquisition element and a ratio of the image-acquisition conditions of the first and second image-acquisition elements.

7 Claims, 5 Drawing Sheets

IMAGE-ACQUISITION DEVICE FOR MICROSCOPE AND MICROSCOPE OBSERVATION METHOD

CROSS-REFERENCE TO RELATED APPLICATIONS

This application is based on Japanese Patent Application No. 2011-007221, the contents of which are incorporated herein by reference.

BACKGROUND OF THE INVENTION

1. Field of the Invention

The present invention relates to image-acquisition devices for microscopes and to microscope observation methods.

2. Description of Related Art

Monitoring cameras that switch between color and monochrome imaging modes for daytime and nighttime are known (for example, see Japanese Unexamined Patent Application, Publication No. 2002-135788).

Such a monitoring camera operates in the color imaging mode in daytime by inserting an infrared (IR) filter to block infrared light, and operates in the monochrome imaging mode at nighttime by removing the IR filter, so as to perform image acquisition while placing high priority on sensitivity.

However, if a single object is to be observed with a microscope under different image-acquisition conditions, the appropriate exposure condition differs for different observation conditions. For this reason, the technology discussed in Japanese Unexamined Patent Application, Publication No. 2002-135788 that simply inserts or removes the IR filter is not applicable to microscope observation.

BRIEF SUMMARY OF THE INVENTION

The present invention provides an image-acquisition device for a microscope and a microscope observation method that can achieve proper exposure within a short period of time even when image-acquisition elements are switched.

A first aspect of the present invention is an image-acquisition device for a microscope, which includes an optical-path branching section that branches light from an object into two optical paths; a first image-acquisition element and a second image-acquisition element that are respectively disposed in the two optical paths branching from the optical-path branching section and that acquire images of the light from the object under different image-acquisition conditions; and an exposure-time calculator that calculates an exposure time for the second image-acquisition element on the basis of an exposure time for the first image-acquisition element and a ratio of the image-acquisition conditions of the first and second image-acquisition elements.

According to the first aspect of the present invention, the optical-path branching section branches the light from the object into two optical paths, and the two image-acquisition elements respectively disposed in the two optical paths acquire images of the light. When an appropriate exposure time is obtained by the first image-acquisition element, the exposure-time calculator calculates the exposure time for the second image-acquisition element on the basis of the exposure time obtained for the first image-acquisition element and the ratio of the image-acquisition conditions of the two elements. Consequently, even when the image-acquisition conditions of the two image-acquisition elements are different, a substantially appropriate exposure time can be obtained for the second image-acquisition element, thereby allowing for observation with proper exposure within a short period of time.

In the above aspect, the image-acquisition device may further include a control section that preliminarily stores data related to the ratio of the image-acquisition conditions, and the exposure-time calculator may calculate the exposure time for the second image-acquisition element on the basis of the exposure time for the first image-acquisition element and the data stored in the control section.

Furthermore, in the above aspect, the ratio of the image-acquisition conditions may include a ratio of sensitivities of the first and second image-acquisition elements.

Accordingly, even when the observation is performed using the two image-acquisition elements with different sensitivities, an appropriate exposure time for the second image-acquisition element can be obtained within a short period of time on the basis of the appropriate exposure time for the first image-acquisition element.

Furthermore, in the above aspect, the ratio of the image-acquisition conditions may include a ratio of pixel binning settings determined on the basis of a readout method of the first and second image-acquisition elements.

Accordingly, even when the observation is performed using the two image-acquisition elements with different pixel binning settings, an appropriate exposure time for the second image-acquisition element can be obtained within a short period of time on the basis of the appropriate exposure time for the first image-acquisition element.

Furthermore, in the above aspect, the image-acquisition device may further include a gradation corrector that corrects gradation characteristics output from the first and second image-acquisition elements, and the ratio of the image-acquisition conditions may include a ratio of correction amounts for the first and second image-acquisition elements corrected by the gradation corrector.

Accordingly, an exposure time that can acquire an image with proper exposure based on an assumption that gradation correction will be performed after the image acquisition can be obtained within a short period of time.

Furthermore, in the above aspect, the image-acquisition device may further include an automatic exposure adjuster that automatically adjusts the exposure time on the basis of the images acquired by the first and second image-acquisition elements, and the automatic exposure adjuster may automatically adjust the exposure time by setting the exposure time calculated by the exposure-time calculator as a default value.

Accordingly, when the automatic exposure adjuster adjusts the exposure time, a substantially appropriate exposure time is set as a default value, thereby significantly shortening the time that it takes to achieve proper exposure.

A second aspect of the present invention is a microscope observation method in which light from an object is branched off into two optical paths and images are acquired using two different image-acquisition elements under different image-acquisition conditions. The method includes a first step of acquiring an image using one of the image-acquisition elements under a first image-acquisition condition with a first exposure time; a second step of calculating a second exposure time for the other image-acquisition element on the basis of the first exposure time and a ratio of the image-acquisition conditions of the two image-acquisition elements; and a third step of acquiring an image using the other image-acquisition element under a second image-acquisition condition with the second exposure time calculated in the second step.

The present invention advantageously achieves proper exposure within a short period of time even when image-acquisition elements are switched.

DETAILED DESCRIPTION OF THE INVENTION

An image-acquisition device 1 for a microscope and a microscope observation method according to an embodiment of the present invention will now be described with reference to the drawings.

Figure 1:
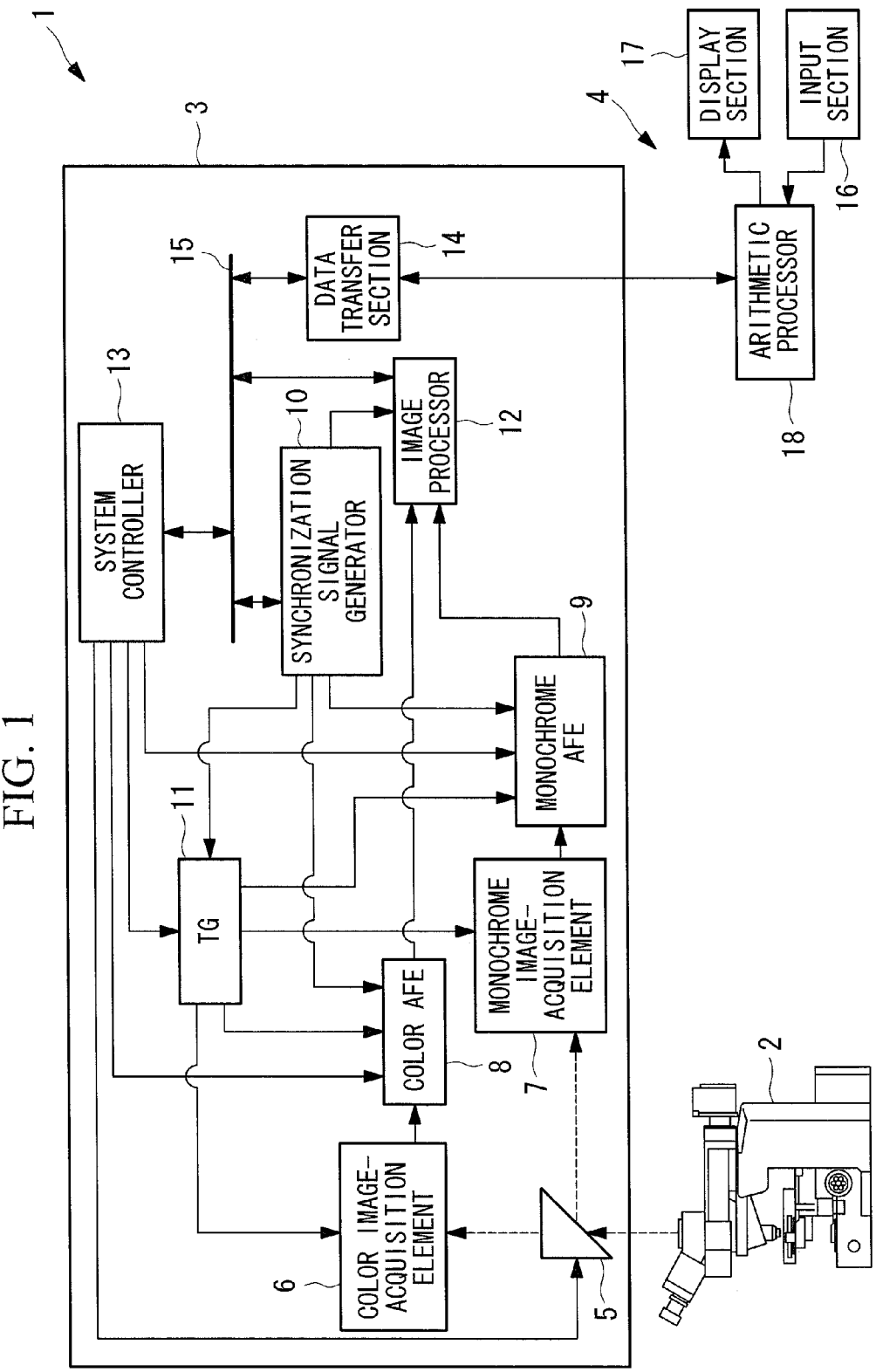
FIG. 1 is an overall configuration diagram illustrating an image-acquisition device for a microscope according to an embodiment of the present invention.

As shown in FIG. 1, the image-acquisition device 1 according to this embodiment includes a camera 3 attached to a microscope 2 and an arithmetic unit 4 that sets image-acquisition conditions for the camera 3.

The camera 3 includes a prism (optical-path branching section) 5 that branches light from an object focused by the microscope 2 into two optical paths, a color image-acquisition element (first image-acquisition element) 6 and a monochrome image-acquisition element (second image-acquisition element) 7 respectively disposed in the two branching optical paths, a color analog-front-end (AFE) 8 and a monochrome AFE 9 that perform preprocessing on image signals acquired by the image-acquisition elements 6 and 7, a synchronization signal generator 10 that generates a horizontal synchronization signal and a vertical synchronization signal, a timing generator (TG) 11 that generates driving signals for driving the image-acquisition elements 6 and 7 and the AFEs 8 and 9 at a timing in synchronization with the generated synchronization signals, an image processor 12 that processes the image signals output from the color AFE 8 and the monochrome AFE 9, a system controller 13 that controls these components, a data transfer section 14 that exchanges data with the arithmetic unit 4, and a bus 15.

In this embodiment, a color charge-coupled device (CCD) is used as the color image-acquisition element 6, and a monochrome CCD is used as the monochrome image-acquisition element 7.

The prism 5 is controlled by the system controller 13 and can change the branching ratio of the optical path from the object by being moved or changed. The optical-path branching ratio of the prism 5 is one of the image-acquisition conditions.

The color image-acquisition element 6 and the monochrome image-acquisition element 7 are respectively disposed in the two branching optical paths extending from the prism 5 and are each configured to convert an observation image, in the microscope 2, formed on an image-acquisition surface into an electrical image signal.

The color AFE 8 and the monochrome AFE 9 remove noise components and perform level adjustments on the image signals respectively received from the color image-acquisition element 6 and the monochrome image-acquisition element 7 by correlated double sampling, and subsequently output digital image signals obtained by analog-to-digital (A/D) conversion to the image processor 12.

The synchronization signal generator 10 outputs the generated horizontal synchronization signal and vertical synchronization signal to the TG 11, the color AFE 8, the monochrome AFE 9, the system controller 13, and the image processor 12. The period of the vertical synchronization signal is set in accordance with a set value of the period output from the system controller 13 and a readout method used for the accumulated charge in the image-acquisition elements 6 and 7.

As driving signals for the image-acquisition elements 6 and 7, the TG 11 outputs vertical transfer clock signals for driving vertical charge transfer paths of the image-acquisition elements 6 and 7, horizontal transfer clock signals for driving horizontal charge transfer paths of the image-acquisition elements 6 and 7, and reset gate signals for resetting output amplifiers of the image-acquisition elements 6 and 7. Moreover, the TG 11 forcedly discharges the charge accumulated in light receiving elements arranged on image-acquisition surfaces of the image-acquisition elements 6 and 7 to a semiconductor substrate, and also generates an electronic shutter pulse signal for stopping the charge accumulation.

Furthermore, the TG 11 controls the exposure time in the image-acquisition process in the image-acquisition elements 6 and 7 on the basis of an output period of the electronic shutter pulse signal. When the TG 11 receives a control signal that indicates a selected readout method (such as full pixel-array readout, partial pixel-array readout, or pixel binning) for the accumulated charge in the image-acquisition elements 6 and 7 from the system controller 13, the TG 11 outputs a driving signal according to the indicated readout method. Furthermore, the TG 11 outputs correlated-double-sampling clock signals and A/D-conversion clock signals as driving signals for the AFEs 8 and 9.

The image processor 12 performs image processing, such as noise reduction, gradation correction, digital gain adjustment, and contrast adjustment, on an image represented by the digital image signals output from the color AFE 8 and the monochrome AFE 9, and outputs the image to the data transfer section 14 via the bus 15.

When the system controller 13 receives the indicated image-acquisition conditions (including the readout method, the set value of the period for the vertical synchronization signal, the exposure time, the sensitivity, and pixel binning) from the arithmetic unit 4 via the data transfer section 14 and the bus 15, the system controller 13 notifies the TG 11 and the synchronization signal generator 10 of the indicated readout method. The system controller 13 calculates the output period for the electronic shutter pulse signal on the basis of the set value of the period for the vertical synchronization signal and the exposure time according to the indicated image-acquisition conditions and sets the calculated output period in the TG 11, and also sets a CDS gain value corresponding to the sensitivity of each of the AFEs 8 and 9.

The data transfer section 14 transfers the image-acquisition conditions output from the arithmetic unit 4 to the system controller 13. The data transfer section 14 also transfers the image processed in the image processor 12 to the arithmetic unit 4.

The arithmetic unit 4 is, for example, a personal computer and includes an input section 16 (such as a mouse and a keyboard) where a user performs input operations, a display section 17 (such as a liquid crystal display unit) that displays an image, and an arithmetic processor 18 connected to the input section 16 and the display section 17. The arithmetic processor 18 outputs the image-acquisition conditions and various commands input from the input section 16 to the system controller 13 via the data transfer section 14 and the bus 15 and makes the display section 17 display the image transmitted from the system controller 13 via the data transfer section 14 and the bus 15. Furthermore, based on the set exposure time that allows for proper exposure in one image-acquisition element 6 (or 7) and the ratio of image-acquisition conditions of the image-acquisition element 6 and the image-acquisition element 7, the arithmetic processor 18 calculates an exposure time for the other image-acquisition element 7 (or 6). Specifically, the arithmetic processor 18 includes an exposure-time calculator.

Figure 2:
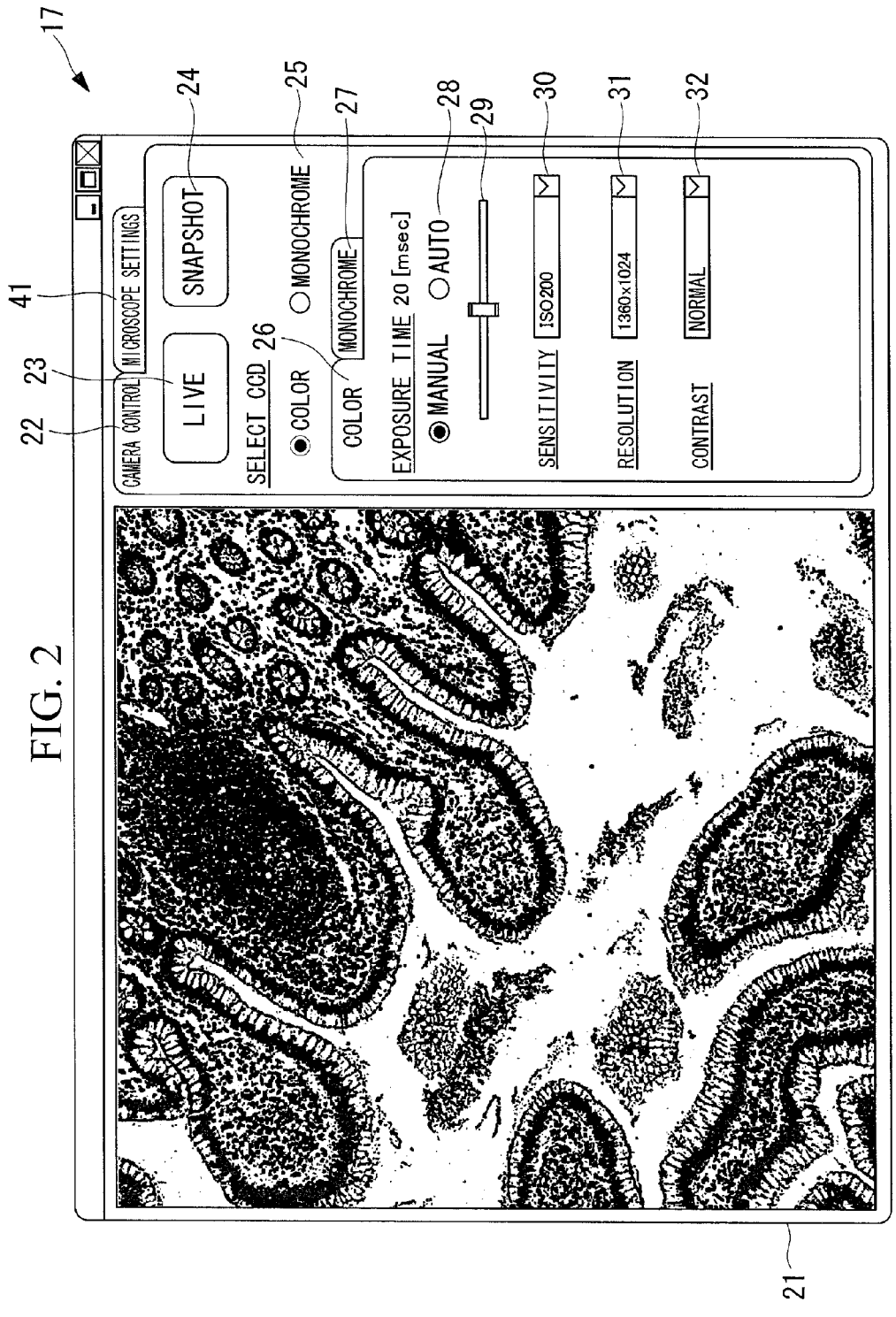
FIG. 2 illustrates a display example when image-acquisition conditions are to be set in a display section provided in the image-acquisition device in FIG. 1.

The display section 17 displays the image processed by the arithmetic processor 18 and also constitutes a graphical user interface (GUI) together with the input section 16, as shown in FIG. 2. FIG. 2 shows a display example of the GUI. It should be noted that the positions, shapes, sizes, and colors of the GUI components, such as input areas, buttons, and sliders, are not limited to those shown in FIG. 2.

In the display example in FIG. 2, a display window 21 that displays an observation image and a camera control tab 22 for controlling the camera 3 are provided.

The camera control tab 22 is provided with a live-imaging button 23, a snapshot-imaging button 24, a CCD selecting button 25, a color-mode image-acquisition-condition setting tab 26, and a monochrome-mode image-acquisition-condition setting tab 27.

The live-imaging button 23 is to be selected when performing live-imaging. The snapshot-imaging button 24 is to be selected when acquiring a still image, and a still image is acquired simultaneously with the pressing of the button 24.

The CCD selecting button 25 is used for selecting one of the image-acquisition elements 6 and 7 to be used for image acquisition. When "color" is selected, the color image-acquisition element 6 is activated, and light is guided to the color image-acquisition element 6 via the prism 5 so that the observation image projected on the image-acquisition surface thereof is displayed on the display window 21. On the other hand, when "monochrome" is selected, the monochrome image-acquisition element 7 is activated, and light is guided to the monochrome image-acquisition element 7 via the prism 5 so that the observation image projected on the image-acquisition surface thereof is displayed on the display window 21.

The color-mode image-acquisition-condition setting tab 26 is provided with an exposure-mode selecting button 28, an exposure-time setting slider 29, a sensitivity selecting combo-box 30, a resolution selecting combo-box 31, and a contrast selecting combo-box 32. These components are to be used for setting the image-acquisition conditions when "color" is selected at the CCD selecting button 25.

The monochrome-mode image-acquisition-condition setting tab 27 is provided with GUI components similar to those in the color-mode image-acquisition-condition setting tab 26. These components are to be used for setting the image-acquisition conditions when "monochrome" is selected at the CCD selecting button 25.

The exposure-mode selecting button 28 is used for selecting between a manual exposure mode and an automatic exposure mode. When the automatic exposure mode is selected, the arithmetic processor 18 automatically calculates an exposure time that allows for proper exposure from the image. Specifically, the arithmetic processor 18 includes an automatic exposure adjuster.

The exposure-time setting slider 29 is operable only when the manual exposure mode is selected at the exposure-mode selecting button 28, and is used for setting the exposure time.

The sensitivity selecting combo-box 30 is used for setting the ISO sensitivity for each of the image-acquisition elements 6 and 7. The ISO sensitivity can be selected from among four kinds, which are 200, 400, 800, and 1600, and ISO 200 is set as a default image-acquisition condition for both the color mode and the monochrome mode.

The resolution selecting combo-box 31 is used for selecting the resolution of the observation image. For example, the resolution is set in accordance with the accumulated-charge readout method in the image-acquisition elements 6 and 7, such as full pixel-array readout or binning. For both the color mode and the monochrome mode, full pixel-array readout is set as a default image-acquisition condition.

The contrast selecting combo-box 32 is used for selecting the contrast of the observation image. The contrast can be selected from among three kinds, which are high, normal, and low. For both the color mode and the monochrome mode, "normal" is set as a default image-acquisition condition.

The following description relates to an exposure-time calculation process performed by the arithmetic processor 18 in the arithmetic unit 4 when the image-acquisition elements 6 and 7 are switched.

Based on the exposure time of the image-acquisition element 6 (7) before the switching operation and the image-acquisition conditions of the image-acquisition element 6 and the image-acquisition element 7, the arithmetic processor 18 calculates an exposure time for the image-acquisition element 7 (6) after the switching operation and sends the calculated exposure time to the system controller 13 via the data transfer section 14 and the bus 15.

The arithmetic processor 18 stores a reference exposure time measured in advance, and calculates the exposure time using the reference exposure time. The reference exposure time is an exposure time that allows for proper exposure under default image-acquisition conditions (sensitivity: ISO 200, resolution: full pixel array, contrast: normal) in a state where a sample is not placed in the microscope 2. The term "proper exposure" is defined as exposure in which an average spatial brightness value in a background area within the acquired observation image satisfies a predetermined target value (e.g., 200 gradations in the case of 256 gradations). The arithmetic processor 18 includes a gradation corrector that corrects the gradation characteristics when the image processor 12 performs gradation correction on an image.

For example, the following description relates to a case where the color imaging mode is switched to the monochrome imaging mode. If an exposure time set using the exposure-time setting slider 29 for the color mode is defined as "exp_color", an exposure time exp_mono set for the monochrome mode is calculated using the following expression (1).

$$\mathrm{exp\_mono} = A \times \mathrm{exp\_color} \times K cam \tag{1}$$

In this case, $A = \mathrm{exp\_ref\_mono}/\mathrm{exp\_ref\_color}$, exp_ref_mono denotes a reference exposure time for the monochrome mode, exp_ref_color denotes a reference exposure time for the color mode, and Kcam denotes a correction coefficient determined from ratios of the image-acquisition conditions between the color mode and the monochrome mode.

The correction coefficient Kcam is calculated from the following expression (2).

$$Kcam = Ksens \times Kreso \times Kcont \quad (2)$$

In this case, Ksens denotes the ratio of the sensitivities (image-acquisition conditions) of the two image-acquisition elements 6 and 7 and can be obtained from Table 1. Kreso denotes the ratio of the resolutions (image-acquisition conditions, i.e., pixel binning settings determined on the basis of the readout method) of the two image-acquisition elements 6 and 7 and can be obtained from Table 2. Furthermore, Kcont denotes the ratio of the contrasts, i.e., image-acquisition conditions, of the two image-acquisition elements 6 and 7 and can be obtained from Table 3.

TABLE 1

Sensitivity Correction Ksens

|  |  | COLOR MODE | | | |
|---|---|---|---|---|---|
|  |  | ISO 200 | ISO 400 | ISO 800 | ISO 1600 |
| MONOCHROME MODE | ISO 200 | 1 | 2 | 4 | 8 |
|  | ISO 400 | ½ | 1 | 2 | 4 |
|  | ISO 800 | ¼ | ½ | 1 | 2 |
|  | ISO 1600 | ⅛ | ¼ | ½ | 1 |

TABLE 2

Resolution Correction Kreso

|  |  | COLOR MODE | | |
|---|---|---|---|---|
|  |  | FULL PIXEL ARRAY | BINNING 2 | BINNING 4 |
| MONOCHROME MODE | FULL PIXEL ARRAY | 1 | 2 | 4 |
|  | BINNING 2 | ½ | 1 | 2 |
|  | BINNING 4 | ¼ | ½ | 1 |

TABLE 3

Contrast Correction Kcont

|  |  | COLOR MODE | | |
|---|---|---|---|---|
|  |  | LOW | NORMAL | HIGH |
| MONOCHROME MODE | LOW | 1 | Vno/Vlo | Vhi/Vlo |
|  | NORMAL | Vlo/Vno | 1 | Vhi/Vno |
|  | HIGH | Vlo/Vhi | Vno/Vhi | 1 |

For example, if the sensitivity for the color mode is set to "ISO 400" relative to "ISO 200", which is a default sensitivity setting, for the monochrome mode, the resolution for the color mode is set to "full pixel array", which is a default setting, relative to "binning 2" set as the resolution for the monochrome mode, and the contrast for the color mode is set to "normal", which is a default setting, relative to "high" set as the contrast for the monochrome mode, the following are obtained:

Ksens=2/1=2,
Kreso=½, and
Kcont=Vno/Vhi.

Figure 3:
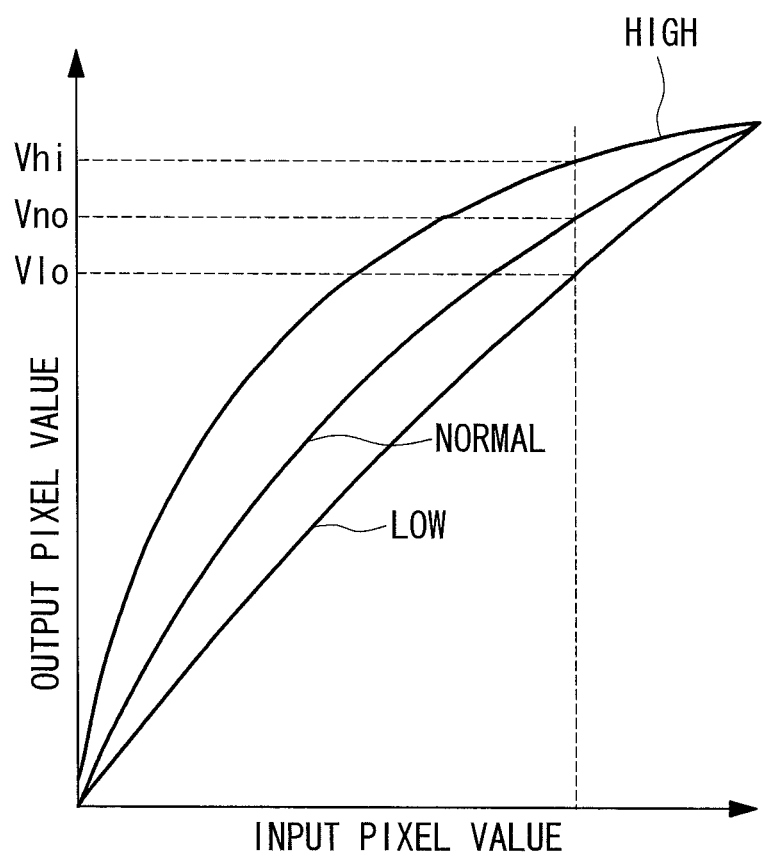
FIG. 3 illustrates a look-up table for contrast adjustment in an arithmetic processor of the image-acquisition device in FIG. 1.

In this case, Vno is a target brightness value used for measuring the reference exposure time when the contrast mode is in a default setting, that is, a normal setting, in a look-up table shown in FIG. 3. Furthermore, referring to the look-up table shown in FIG. 3, Vhi and Vlo are output pixel values when the contrast modes of input pixel values corresponding to the output pixel value Vno are high and low, respectively. The arithmetic processor 18 includes a control section that preliminarily stores Tables 1, 2, and 3 and data related to the ratios of image-acquisition conditions shown in FIG. 3.

As a result, the correction coefficient Kcam in this case is obtained as follows: Kcam=2×½×Vno/Vhi=Vno/Vhi. By substituting this value into expression (1), an exposure time that allows for proper exposure when switched to the monochrome mode can be calculated.

Specifically, the microscope observation method according to this embodiment includes a first step of acquiring an image using one of the image-acquisition elements 6 and 7, for example, the color image-acquisition element 6, under a first image-acquisition condition with a first exposure time, a second step of calculating a second exposure time using expression (1) on the basis of the first exposure time and the ratio of the image-acquisition conditions of the two image-acquisition elements 6 and 7, and a third step of acquiring an image using the other image-acquisition element 7 or 6, for example, the monochrome image-acquisition element 7, under a second image-acquisition condition with the second exposure time calculated in the second step.

Accordingly, with the image-acquisition device 1 for a microscope and the microscope observation method according to this embodiment, when the image-acquisition elements 6 and 7 that perform image acquisition are to be switched, an exposure time that allows for proper exposure in the image acquisition after the switching operation is automatically calculated and set, whereby uniform brightness of acquired observation images can advantageously be maintained before and after the switching operation of the image-acquisition elements 6 and 7. Consequently, an exposure time that allows for proper exposure can be set within a short period of time, thereby eliminating the need for a user to manually set the exposure time again.

Although the above embodiment is described with reference to an example where the color mode is switched to the monochrome mode, the exposure time can advantageously be calculated and set readily within a short period of time with the same process in a case where the monochrome mode is switched to the color mode.

Furthermore, although the above description is directed to a case where ISO sensitivity is used as the sensitivity of each of the image-acquisition elements 6 and 7, set gain values determined on the basis of the CDS gains of the AFEs 8 and 9 and the digital gain of the image processor 12 may be used as an alternative.

In that case, a default set gain value is defined as a gain of 1×, and a table of correction coefficients Ksens determined on the basis of a combination of settable ISO sensitivities for the color mode and gain values for the monochrome mode may be made and used in place of Table 1.

Furthermore, although the above embodiment is described with reference to a manual exposure mode in which the exposure time is manually set as an example, the embodiment may alternatively be applied to a case where an automatic exposure mode in which the exposure time is automatically calculated is selected. In that case, it is preferable that exp_mono calculated from expression (1) be used as a default value for automatic exposure adjustment after the color mode is switched to the monochrome mode. Accordingly, the automatic exposure adjustment commences from an exposure time that substantially allows for proper exposure, thereby advantageously shortening the time that it takes to achieve proper exposure.

Furthermore, although the above embodiment is directed to a case where the observation method is the same between the color mode and the monochrome mode, the observation method may be different for each of the image-acquisition elements 6 and 7 to be used, such as using a bright-field observation method for the color mode and a differential-interference observation method for the monochrome mode.

Figure 4:
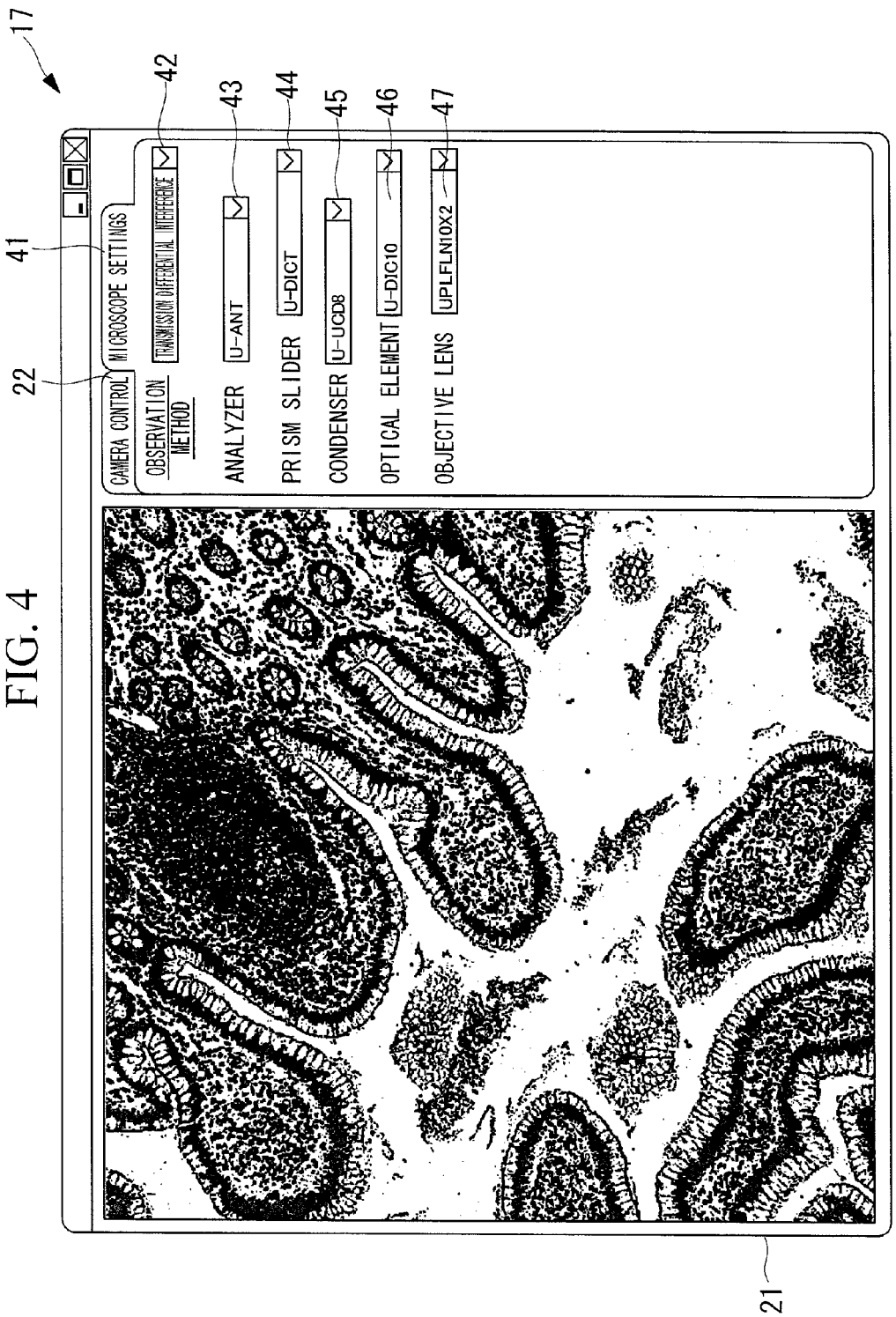
FIG. 4 illustrates a display example when image-acquisition conditions are to be set in the display section provided in the image-acquisition device in FIG. 1.

In that case, a microscope setting tab 41 is selected, as shown in FIG. 4.

The microscope setting tab 41 is provided with an observation-method selecting combo-box 42. When "transmission differential-interference" is selected in the observation-method selecting combo-box 42, an analyzer selecting combo-box 43, a prism-slider selecting combo-box 44, a condenser selecting combo-box 45, an optical-element selecting combo-box 46, and an objective-lens selecting combo-box 47 are displayed as the GUI for setting the microscope optical components.

These combo-boxes 43 to 47 are provided for the user to input the microscope optical components constituting the microscope 2.

The set microscope optical components are reflected in the exposure-time calculation process in the following manner.

For example, if the color mode for performing bright-field observation is switched to the monochrome mode for performing transmission differential-interference observation, the exposure time for the monochrome mode is calculated using the following expression (3).

$$exp\_mono = A \times exp\_color \times Kcam \times Kopt \qquad (3)$$

In this case, Kopt denotes a correction coefficient determined from the settings of the optical components of the microscope 2.

For example, when default optical components are set as the optical components, except for the objective lens, for the monochrome mode, if the objective lens set for the monochrome mode transmits light having a brightness that is N times that of a default objective lens, the brightness of an acquired image would be N times that in a case where the default objective lens is set. In view of this, the correction coefficient Kopt is set to 1/N so that acquired images before and after the switching operation of the image-acquisition elements 6 and 7 have substantially the same brightness.

With regard to the optical components other than the objective lens, the same method can be used to determine the correction coefficient Kopt by measuring the ratio of the brightness relative to the default optical components.

Accordingly, even in the case where different observation methods are used for the image-acquisition elements 6 and 7, an exposure time that allows for proper exposure can advantageously be calculated and set within a short period of time.

Furthermore, although transmission differential-interference observation is described above as an example, the embodiment can similarly be applied to a case where epifluorescence observation is performed in place of the aforementioned observation.

Figure 5:
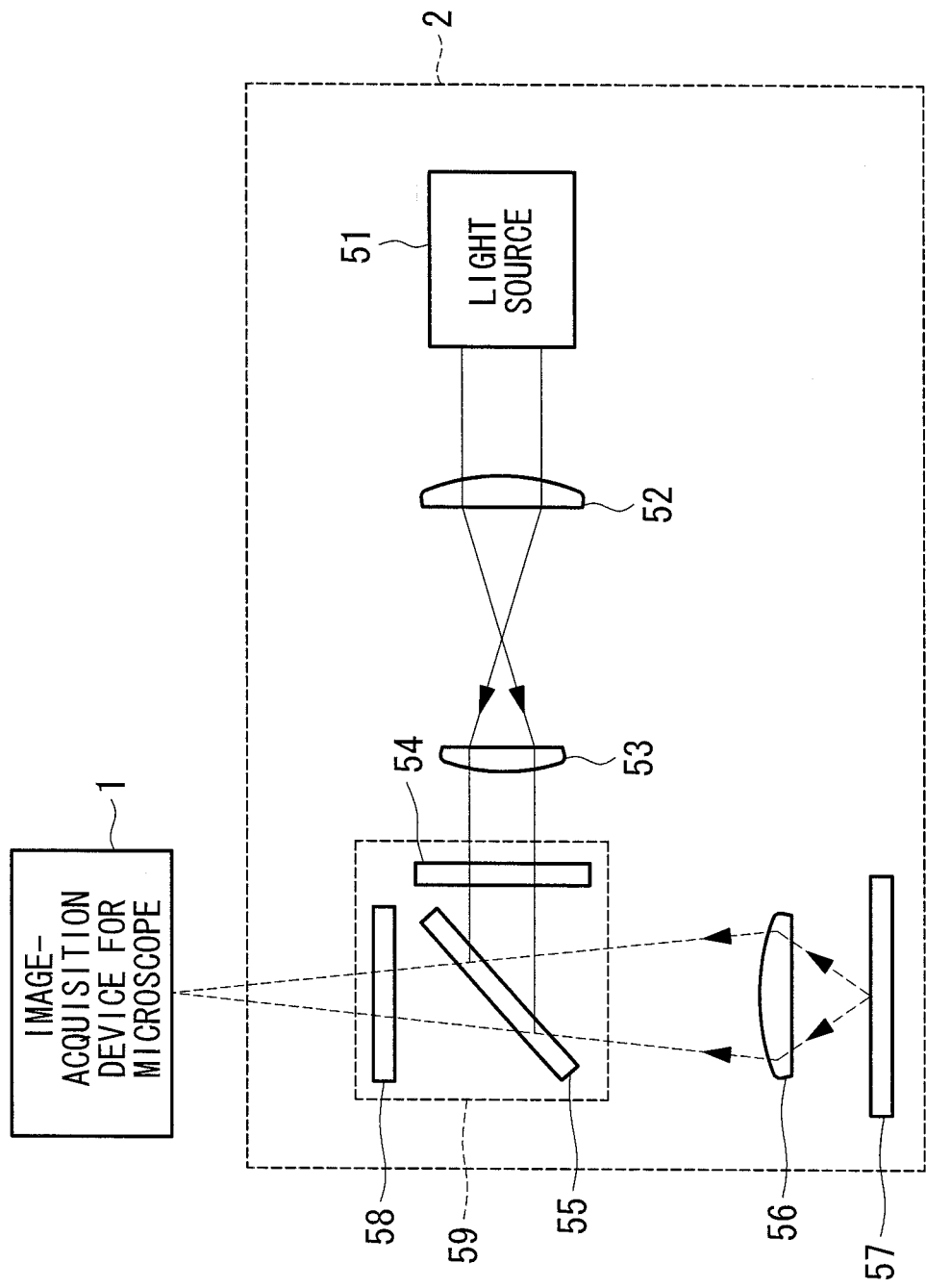
FIG. 5 illustrates a configuration example of optical components of an epifluorescence microscope to which the image-acquisition device in FIG. 1 is attached.

In the epifluorescence observation, illumination light emitted from a light source 51 enters an excitation filter 54 via a converging lens 52 and an illuminating lens 53, as shown in FIG. 5. Excitation light transmitted through the excitation filter 54 is reflected by a dichroic mirror 55 and is converged by an objective lens 56 so as to be radiated on a sample 57 stained with a fluorescent reagent. Fluorescence is generated from the sample 57 having received the excitation light, and a portion thereof enters the objective lens 56 and subsequently becomes incident on the image-acquisition device 1 via the dichroic mirror 55 and an absorption filter 58. The excitation filter 54, the dichroic mirror 55, and the absorption filter 58 are combined into a single optical component as a fluorescence cube 59.

In such epifluorescence observation, the brightness ratio between default optical components (i.e., the light source 51, the objective lens 56, and the fluorescence cube 59) and other optical components may be measured in advance as a correction value, and an exposure time calculated on the basis of this correction value may be used as a default value for automatic exposure adjustment, so that the automatic exposure adjustment can be completed within a short period of time, thereby shortening the time that it takes to achieve proper exposure.

Although the optical path is branched off by using the prism 5 in the above embodiment, the optical path may alternatively be changed by inserting or removing the prism 5. This allows for the use of only one of the color image-acquisition element 6 and the monochrome image-acquisition element 7.

Furthermore, although CCDs are used as the image-acquisition elements in the above embodiment, complementary metal-oxide semiconductor (CMOS) image-acquisition elements may be used as an alternative. Moreover, the number of image-acquisition elements is not limited to two, but may be three or more.

What is claimed is:

1. An image-acquisition device for a microscope, comprising:
    an optical-path branching section that branches light from an object into two optical paths;
    a first image-acquisition element and a second image-acquisition element that are respectively disposed in the two optical paths branching from the optical-path branching section and that acquire images of the light from the object under different image-acquisition conditions; and
    an exposure-time calculator configured to calculate, in a case where an acquisition with the first image-acquisition element is switched to an acquisition with the second image-acquisition element, an exposure time for the second image-acquisition element after a switching operation on the basis of an exposure time for the first image-acquisition element before the switching operation and a ratio between the image-acquisition condition of the first image-acquisition element before the switching operation and the image-acquisition condition of the second image-acquisition element after the switching operation;
    wherein one of the first image-acquisition element and the second image-acquisition element is used as a color image-acquisition element for acquiring a color image, the other image-acquisition element is used as a monochrome image-acquisition element for acquiring a monochrome image, and
    the ratio of the image-acquisition conditions includes a ratio of sensitivities of the first image-acquisition element before the switching operation and the second image-acquisition element after the switching operation.

2. The image-acquisition device according to claim 1, further comprising a control section configured to preliminarily store data related to the ratio of the image-acquisition conditions, and
    wherein the exposure-time calculator is configured to calculate the exposure time for the second image-acquisition element on the basis of the exposure time for the first image-acquisition element and the data stored in the control section.

3. The image-acquisition device according to claim 1, wherein the ratio of the image-acquisition conditions includes a ratio of pixel binning settings determined on the basis of a readout method of the first and second image-acquisition elements.

4. The image-acquisition device according to claim 1, further comprising a gradation corrector configured to correct gradation characteristics output from the first and second image-acquisition elements, and
   wherein the ratio of the image-acquisition conditions includes a ratio of correction amounts for the first and second image-acquisition elements corrected by the gradation corrector.

5. The image-acquisition device according to claim 1, further comprising an automatic exposure adjuster configured to automatically adjust the exposure time on the basis of the images acquired by the first and second image-acquisition elements, and
   wherein the automatic exposure adjuster is configured to automatically adjust the exposure time by setting the exposure time calculated by the exposure-time calculator as a default value.

6. The image-acquisition device according to claim 1, wherein the ratio between the image-acquisition condition of the first image-acquisition element before the switching operation and the image-acquisition condition of the second image-acquisition element after the switching operation is determined by a ratio of sensitivities, a ratio of resolutions, and a ratio of contrasts, of the first image acquisition element and the second image-acquisition element.

7. A microscope observation method in which light from an object is branched off into two optical paths and images are acquired using a first image-acquisition element and a second image-acquisition element under different image-acquisition conditions, the method comprising:
   a first step of acquiring an image using the first image-acquisition element under a first image-acquisition condition with a first exposure time;
   a second step of calculating, in a case where an acquisition with the first image-acquisition element is switched to an acquisition with the second image-acquisition element, a second exposure time for the second image-acquisition element after a switching operation on the basis of the first exposure time before the switching operation and a ratio between the first image-acquisition condition of the first image-acquisition element before the switching operation and the second image-acquisition condition of the second image-acquisition element after the switching operation; and
   a third step of acquiring an image using the second image-acquisition element under the second image-acquisition condition with the second exposure time calculated in the second step,
   wherein one of the first image-acquisition element and the second image-acquisition element is used as a color image-acquisition element for acquiring a color image, the other image-acquisition element is used as a monochrome image-acquisition element for acquiring a monochrome image, and
   the ratio of the image-acquisition conditions includes a ratio of sensitivities of the first image-acquisition element before the switching operation and the second image-acquisition element after the switching operation.

* * * * *